United States Patent

Kuyama et al.

[11] Patent Number: 5,847,484
[45] Date of Patent: Dec. 8, 1998

[54] SLEEVE TYPE OF CORELESS MOTOR WITH REDUCED STARTING CURRENT

[75] Inventors: Kouji Kuyama, Yonago; Kodo Fukuoka, Tottori-ken, both of Japan

[73] Assignee: Matsushita Electric Industrial Co.,Ltd., Japan

[21] Appl. No.: 756,979

[22] Filed: Nov. 26, 1996

[30] Foreign Application Priority Data

Nov. 27, 1995 [JP] Japan ................................ 7-307293

[51] Int. Cl.$^6$ .............................. H02K 1/00; H02K 3/00
[52] U.S. Cl. ...................... 310/179; 310/154; 310/198; 310/203; 310/261; 310/266
[58] Field of Search .................... 310/179, 180, 310/154, 266, 198, 203, 261; 417/198; 29/596, 598

[56] References Cited

U.S. PATENT DOCUMENTS

| | | | |
|---|---|---|---|
| 3,793,548 | 2/1974 | Faulhaber | 310/266 |
| 4,327,304 | 4/1982 | Aoki | 310/266 |
| 4,373,256 | 2/1983 | Nakamura | 29/598 |
| 4,463,276 | 7/1984 | Nakamura | 310/266 |
| 5,036,239 | 7/1991 | Yamaguchi | 310/268 |
| 5,270,602 | 12/1993 | Takehara | 310/198 |

FOREIGN PATENT DOCUMENTS

| | | | |
|---|---|---|---|
| 63-290140 | 11/1988 | Japan | 310/692 |
| 2-55559 | 2/1990 | Japan | 310/692 |

Primary Examiner—Steven L. Stephan
Assistant Examiner—Elvin G. Enad
Attorney, Agent, or Firm—Rossi & Associates

[57] ABSTRACT

According to the present invention, a coreless motor is provided, which comprises: a stator having a circular slot therein, magnets on a wall of the slot, two brushes attached thereto, and metals, which are arranged concentrically; and a rotor having a shaft rotatably supported by the metals, a coil assembly, and a commutator arranged around the shaft, the coil assembly having successive 1st to Nth coils in the slot confronting the magnets and (N+1) taps and a commutator including segments respectively connected to the (N+1) taps, the first to Nth coils connected to the segments through the (N+1) taps respectively, the two brushes selectively contacting with two of the segments successively. The 1st-Nth coils have a sleeve form and each has a rectangular winding pattern, the 1st-Nth coils and the (N+1) taps form a continuous wire, and a coil opening angle is substantially 180° and a coil pitch is 180°/(N+1) to 360°/(N+1). Open end coils may be provided both ends of 1st-Nth coils to provide loop form taps. The coils may be formed of a high tensile force strength wire. That is, the coils may comprise an alloy including at least copper and silver and having a resistivity from $2\mu\Omega\cdot$cm to $3.5\mu\Omega\cdot$cm and a tensile force strength from 200 N/mm$^2$ to 500 N/mm$^2$.

6 Claims, 7 Drawing Sheets

5,847,484

SLEEVE TYPE OF CORELESS MOTOR WITH REDUCED STARTING CURRENT

BACKGROUND OF THE INVENTION

1. Field of the Invention

This invention relates to a sleeve type of coreless motor.

2. Description of the Prior Art

A sleeve type of coreless motor is known, which comprises: a stator having a circular slot therein, magnets on a wall of the slot, two brushes attached thereto, and metals, which are arranged concentrically; and a rotor having a shaft supported by the metals, a coil sleeve, and a commutator arranged around the shaft, the coil sleeve having coils in the slot confronting the magnets and taps and a commutator including segments respectively connected to the taps, the coils connected to the segments through the taps, the two brushes selectively contacting with two of the segments successively.

FIG. 9 is a wiring diagram of this prior art sleeve type of coreless motor. FIG. 10 is an illustration of the prior art showing an operation condition.

In FIG. 9, coils 33a and 33b are connected to a segment 34b through a tap 40b, coils 33b and 33c are connected to a segment 34c through a tap 40c, and the coil 33c and coil 33a are connected to a segment 34a through taps 40d and 40a respectively.

A current supplied from a brush 39a flows through the coil 33b and the coils 33c and 33a to the brush 39. Therefore, a torque is generated at all coils 33a to 33c. this sleeve type coreless motor is used as an actuator of a vibrator used in a pager or the like.

In this prior art sleeve type of coreless motor, to decrease a starting current, it is necessary to decrease the diameter of wires of the coils. However, a decrease in the diameter may cause a disconnection between the coil and the segment during or after assembling.

SUMMARY OF THE INVENTION

The aim of the present invention is to provide an improved coreless motor.

According to the present invention, a first coreless motor is provided, which comprises: a stator having a circular slot therein, magnets on a wall of the slot, two brushes attached thereto, and metals, which are arranged concentrically; and a rotor having a shaft rotatably supported by the metals, a coil assembly, and a commutator arranged around the shaft, the coil assembly having successive first and Nth coils in the slot confronting the magnets and (N+1) taps and a commutator including segments respectively connected to the (N+1) taps, the first to Nth coils connected to the segments through the (N+1) taps respectively, the two brushes selectively contacting with two of the segments successively, the N being a natural number more that one.

In the first coreless motor, the coil assembly has a sleeve form and each of the coils has a rectangular winding pattern, the first to Nth coils and the (N+1) taps form a continuous wire, and a coil opening angle of the coils is substantially 180° and a coil pitch of the coils ranges from 180°/(N+1) to 360°/(N+1).

In the first coreless motor, the coil assembly further has a first winding having a first end connected to the first coil through one of the (N+1) taps and a second end opened and a second winding having a third end connected to the Nth coil through another one of the (N+1) taps and a fourth end opened, and the first winding, the first to Nth coils, and the second winding form a sleeve and the (N+1) tapes form a continuous wire.

According to this invention a second coreless motor is provided, which comprises: a stator having a circular slot therein, magnets on a wall of the slot, two brushes attached thereto, and metals, which are arranged concentrically; and a rotor having a shaft rotatably supported by the metals, a coil assembly, and a commutator arranged around the shaft, the coil assembly having successive coils in the slot confronting the magnets and taps and a commutator including segments respectively connected to the taps, the coils connected to the segments through the taps, the two brushes selectively contacting with two of the segments successively, wherein the coils formed of a high tensile force strength wire.

According to this invention a third coreless motor is provided, which comprises: a stator having a circular slot therein, magnets on a wall of the slot, two brushes attached thereto, and metals, which are arranged concentrically; and a rotor having a shaft rotatably supported by the metals, a coil assembly, and a commutator arranged around the shaft, the coil assembly having successive coils in the slot confronting the magnets and taps and a commutator including segments respectively connected to the taps, the coils connected to the segments through the taps, the two brushes selectively contacting with two of the segments successively, wherein each of the coils comprises an alloy including at least copper and silver and having a resistivity from $2\mu\Omega\cdot cm$ to $3.5\mu\Omega\cdot cm$ and a tensile force strength from $200 N/mm^2$ to $500 N/mm^2$.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Hereinbelow will be described a first embodiment of this invention.

Figure 1:
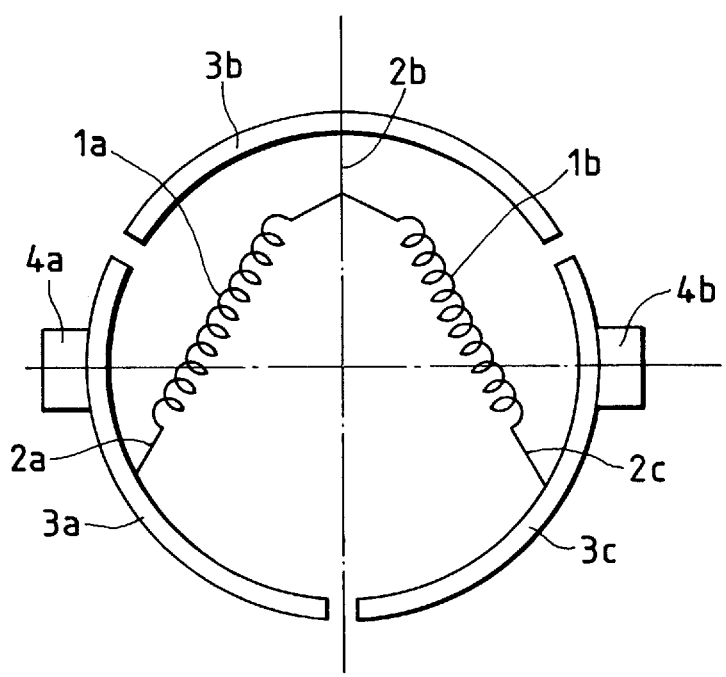
FIG. 1 is a wiring drawing of a sleeve type of coreless motor of a first embodiment.
Figure 2:
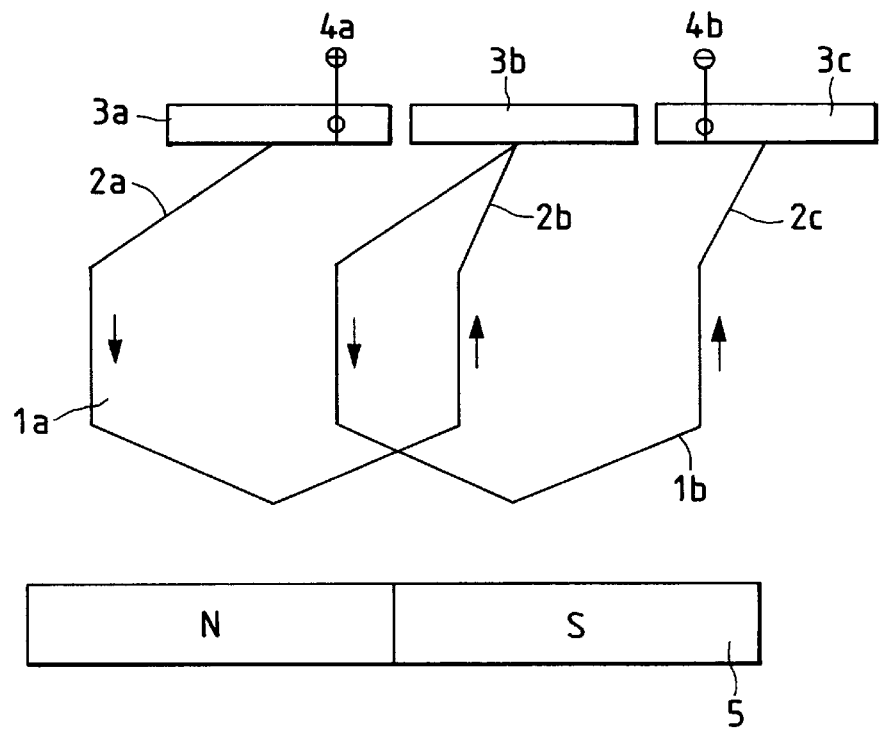
FIG. 2 is an illustration illustrating an operation of the sleeve type of coreless motor of the first embodiment.
Figure 3:
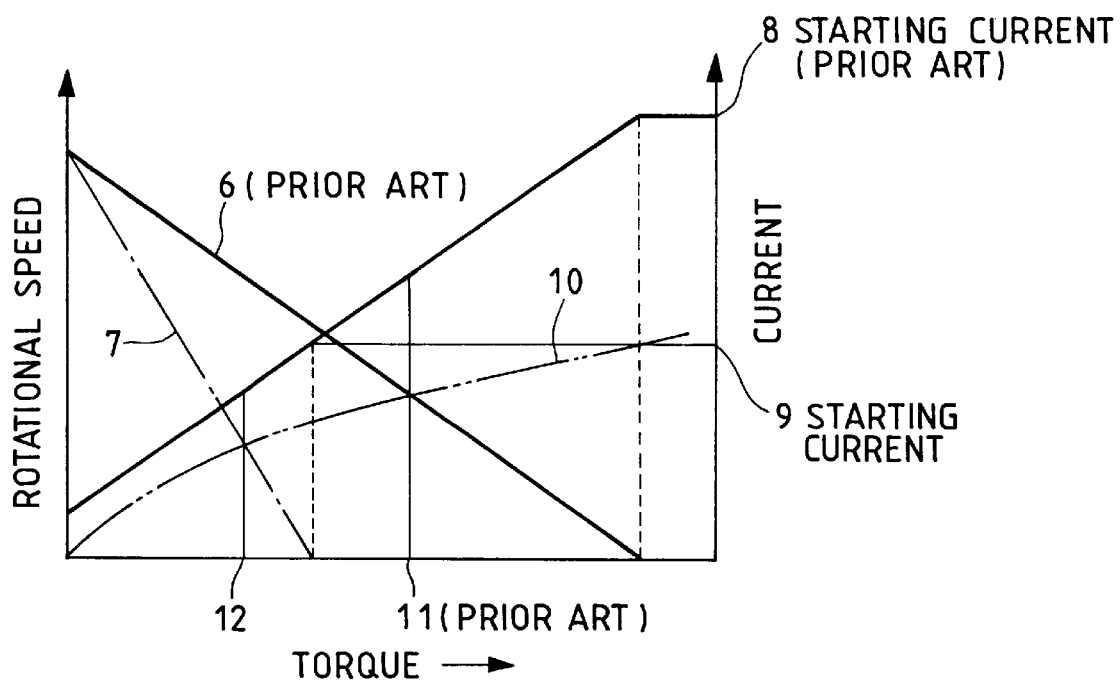
FIG. 3 is a graphical drawing of the sleeve type of coreless motor of the first embodiment.
Figure 8:
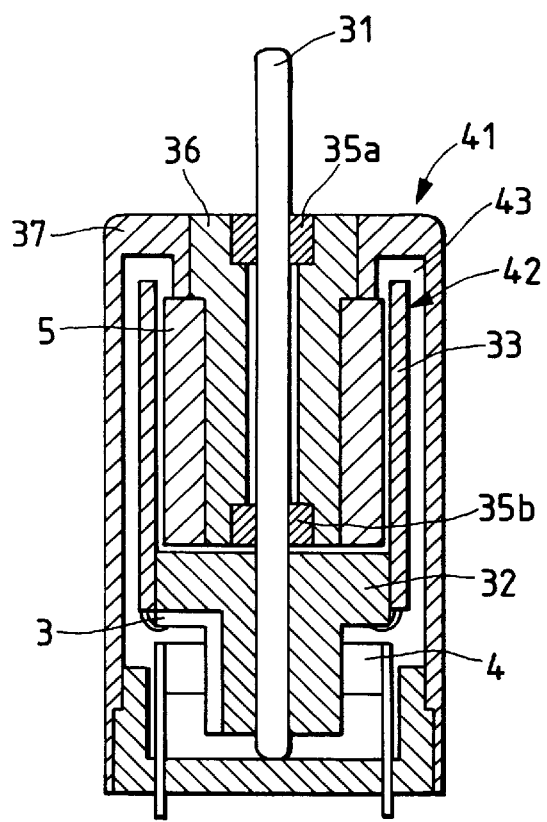
FIG. 8 is a cross-sectional view of a sleeve type of coreless motor of this invention.

FIG. 8 is a cross-sectional view of a sleeve type of coreless motor of this invention. FIG. 1 is a wiring drawing of the sleeve type of coreless motor of the first embodiment. FIG. 2 is an illustration illustrating an operation of the sleeve type of coreless motor of the first embodiment. FIG. 3 is a graphical drawing of the sleeve type of coreless motor of the first embodiment.

The sleeve type of coreless motor of the first embodiment comprises a stator 41 having a circular slot 43 therein, magnets 5 on a wall of the slot 43, two brushes 4 (4a and 4b) attached thereto, and metals 35a and 35b, which are arranged concentrically; and a rotor 42 having a shaft 31 rotatably supported by the metals 35a and 35b, a coil sleeve (assembly) 33, and a commutator 32 which are arranged around the shaft 31, the coil sleeve 33 having coils 1a and 1b in the slot 43, confronting the magnets 5, and taps 2 (2a to 2c). The commutator 32 includes segments 3 (3a to 3c) respectively connected to the taps 2a to 2c. One end of the coil 1a is connected to the segment 3a through the tap 2a and the other end of the coil 1a is connected to the segment 3b through the tap 2b. One end of the coil 1b is connected to the segment 3c through the tap 2c and the other end of the coil 1b is connected to the segment 3b t hrough the tap 2b. The brushes 4a and 4b selectively contact with two of the segments 3a to 3c successively.

An operation will be described.

A drive current supplied from the brush 4a flows through the coil 1a and 1b to the brush 4b. The magnets 5 respectively having N and S poles are arranged to confront the coils 1a or 1b. Then, when the drive current flows through the coils 1a and 1b, a rotational force is developed between the coils 1a and 1b and magnets 5.

Figure 9:
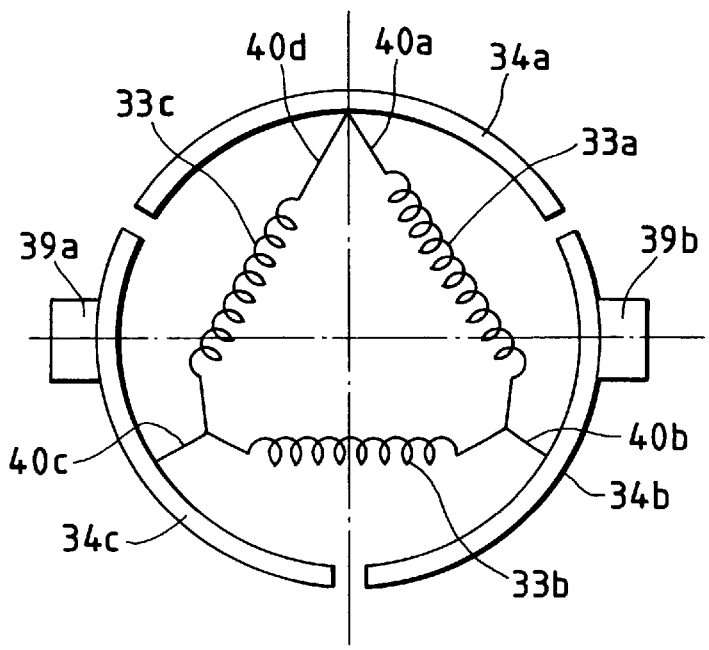
FIG. 9 is a wiring diagram of a prior art sleeve type of coreless motor.
Figure 10:
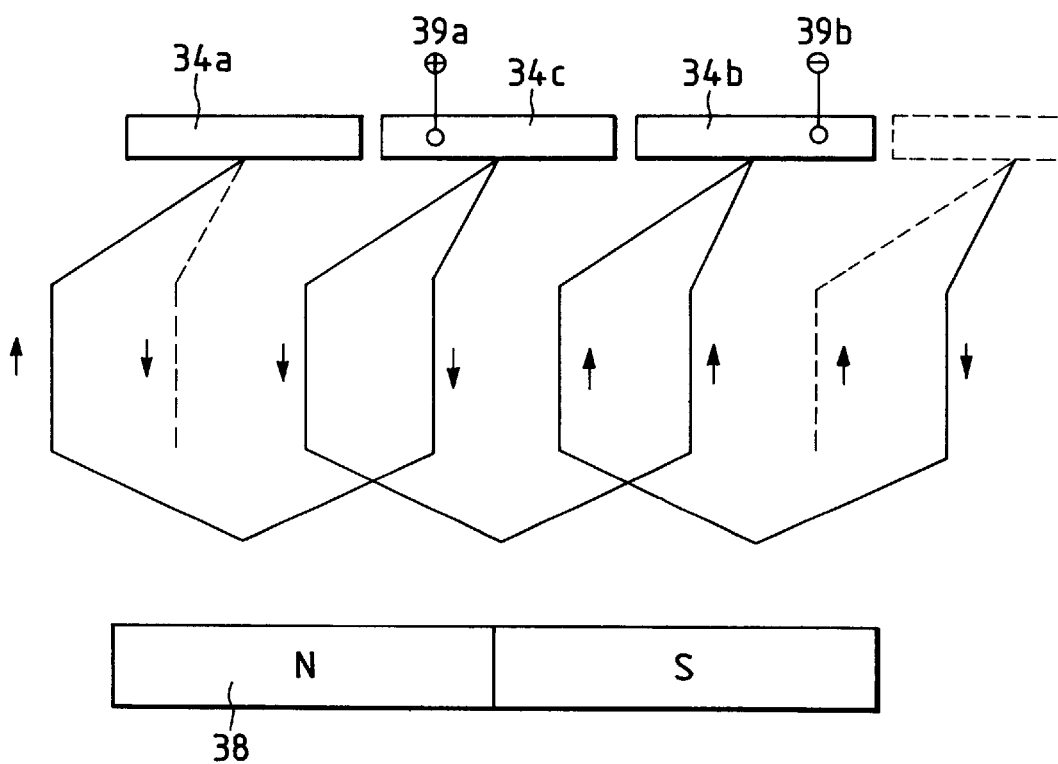
FIG. 10 is an illustration of the prior art showing an operation condition.

This sleeve type of coreless motor shows a current-torque characteristic 7 as shown in FIG. 3. In this sleeve type of coreless motor, though a torque is a half of that of the prior art sleeve type of coreless motor having coils as shown in FIGS. 9 and 10, a starting current 9 is made half of the starting current of the prior art sleeve type of coreless motor shown in FIG. 9 and 10. Therefore, with the coils having the same diameter, the sleeve type coreless motor showing a half of the starting current is provided.

Moreover, in the case that this sleeve type of coreless motor is coupled to an unbalance load, the load varies as shown by the rotational speed-load characteristic 10. A line 11 represents a prior art balanced load and a line 12 shows a balanced load of this sleeve type of coreless motor of the first embodiment. Therefore, a current continuously flowing in an operating condition, is also reduced.

In this embodiment, it is unnecessary to connect the taps 2a and 2c, so that a possibility of a wiring defect at the taps 2a and 2c is reduced.

As mentioned, the sleeve type of coreless motor of the first embodiment comprises; the stator 41 having the circular slot 43 therein, magnets 5 on the wall of the slot 43, two brushes 4 attached thereto, and metals 35a and 35b, which are arranged concentrically; and the rotor 42 having the shaft 31 rotatably supported by the metals 35a and 35b, the coil sleeve 33, and the commutator 32 arranged around the shaft 31, the coil sleeve 33 having successive first and Nth coils (1a and 1b) in the slot 43 confronting the magnets 5 and (N+1) taps (2a, 2b, 2c) and the commutator 32 including segments 3a to 3c respectively connected to the (N+1) taps (2a, 2b, 2c), the first to Nth coils (1a and 1b) connected to the segments 3a to 3c through the (N+1) taps (2a, 2b, 2c), the two brushes 4a and 4b selectively contacting with two of the segments 3a to 3c successively, the N being a natural number more that one. Therefore, it is not necessary to connect both ends of a wire, which forms the coils and taps, to a segment, so that a defection such as a disconnection at the tap directly or indirectly caused from the assembling processing between the taps and the segments is prevented. Moreover, the coils 1a and 1b is connected in series (not in parallel) by brush 4a and 4b in operation, so that a resistance is relatively high. Therefore, with the same diameter of the wire, a sleeve type of coreless motor showing a lower drive current characteristic is provided.

A second embodiment will be described.

Figure 4A:
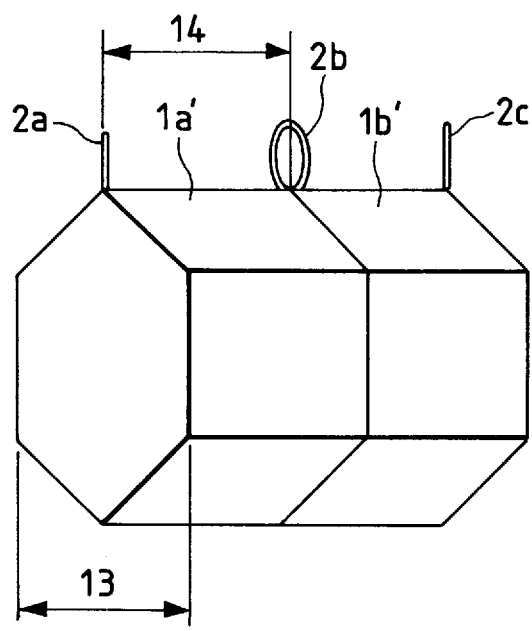
FIG. 4A is a wiring diagram of a sleeve type of coreless motor of a second embodiment.
Figure 4B:
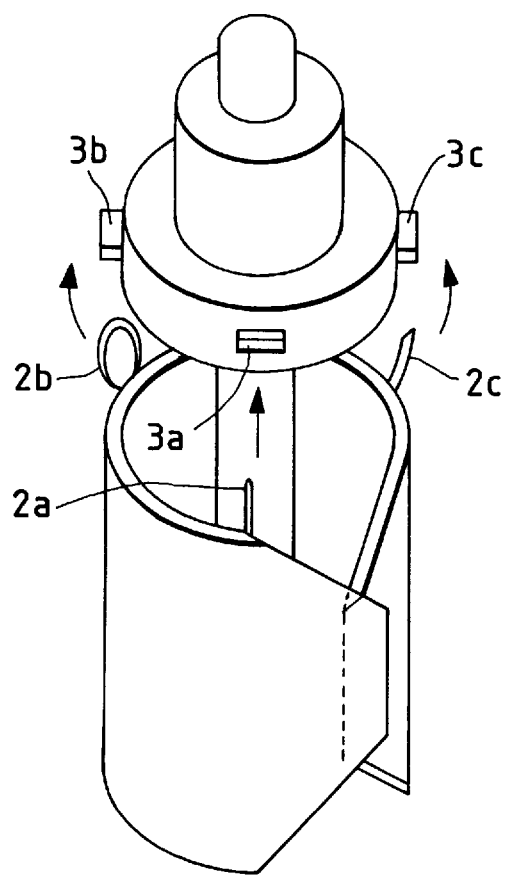
FIG. 4B is a partial perspective view of the sleeve type of coreless motor of the second embodiment.

FIG. 4A is a wiring diagram of a sleeve type of coreless motor of the second embodiment. FIG. 4B is a partial perspective view of the sleeve type of coreless motor of the second embodiment.

The sleeve type of coreless motor of the second embodiment has substantially the same structure as that of the first embodiment. The different is in the structure of the coils. More specifically, the wiring of coils 1a' and 1b' is similar to the first embodiment as shown in FIG. 1. However, the coils 1a' and 1b' are formed of a wire wound rectangularly with taps 2a, 2b, and 2c and are formed to have a coil opening angle of 180° and a coil pitch 14 is from 180°/3 to 360°/3 when the coils 1a' and 1b' are formed to have the sleeve shape. The tap 2a which is an end of the wire forming the coils 1a' and 1b' is connected to the segment 3a, the tap 2b a middle portion of the wire is connected to the segment 3c, and the other end of the wire forming the coils 1a' and 1b' which is the tap 2c is connected to the segment 3c.

Figure 5A:
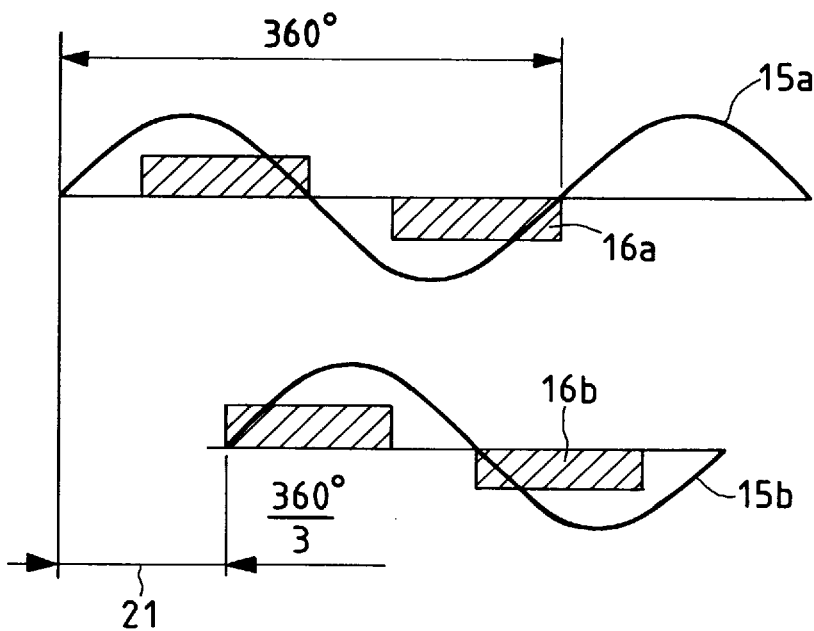
FIGS. 5A and 5B are graphical drawings of the second embodiment showing a relation between induced voltages and drive current supplying periods.
Figure 5B:
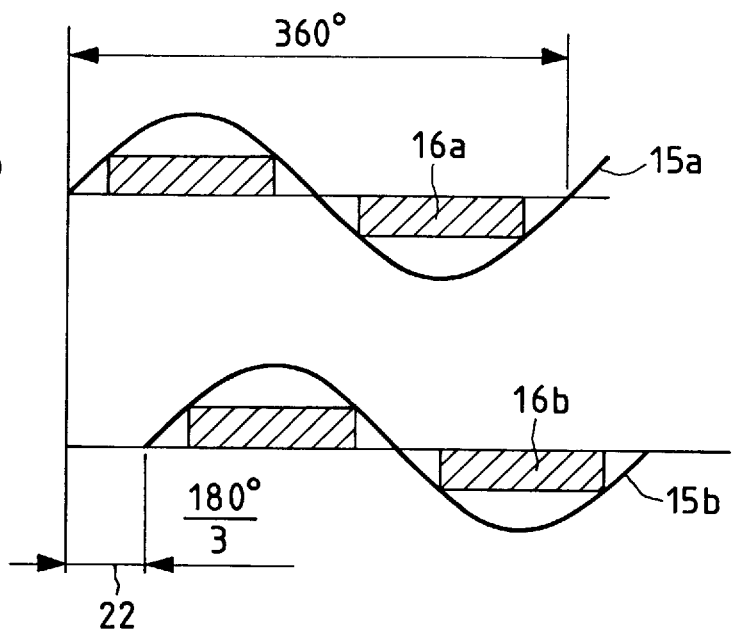

FIGS. 5A and 5B are graphical drawings of the second embodiment showing relations between induced voltages and drive current supplying periods of coils 1a' and 1b'. FIG. 5A shows the case that the coil pitch is 360°/3 and FIG. 5B shows the case that the coil pitch is 180°/3. In FIG. 5A, an induced voltage 15a is generated in the coil 1a' with rotation of the rotor 42. A drive current flows through the coil 1a' for the current supplying periods 16a. On the other hand, an induced voltage 15b is generated in the coil 1b' with the rotation of the rotor 42, wherein there is a phase difference 21 of 360°/3 between the induced voltages 15a and 15b because of the coil pitch 14. A drive current flows through the coil 1b' for the current supplying periods 16b. As shown in FIG. 5A, the drive current is supplied adequately.

In FIG. 5B, in the case that the coil pitch is 180°/3, there is a phase difference 22 of 180°/3 between the induced voltages 15a and 15b because of the coil pitch 14. As shown in FIG. 5B, the drive current is supplied favorably. That is, the drive current supplying period 16b is favorably in phase with the induced voltage 15b, so that a fluctuation in a torque can be prevented.

In the second embodiment, a wire is wound to form the tap 2a, the coil 1a', the tap 2b, the coil 1b', and the tap 2c, that is, these coils and taps is made continuous. There is no connection between coils, a defection in connection point can be prevented and a connecting processing is eliminated.

A third embodiment will be described.

Figure 6A:
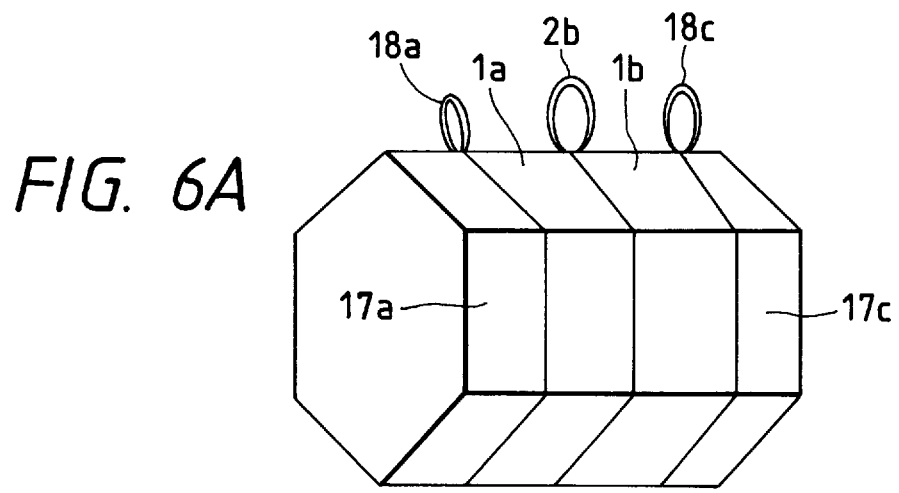
FIG. 6A is a wiring diagram of a sleeve type of coreless motor of a third embodiment.
Figure 6B:
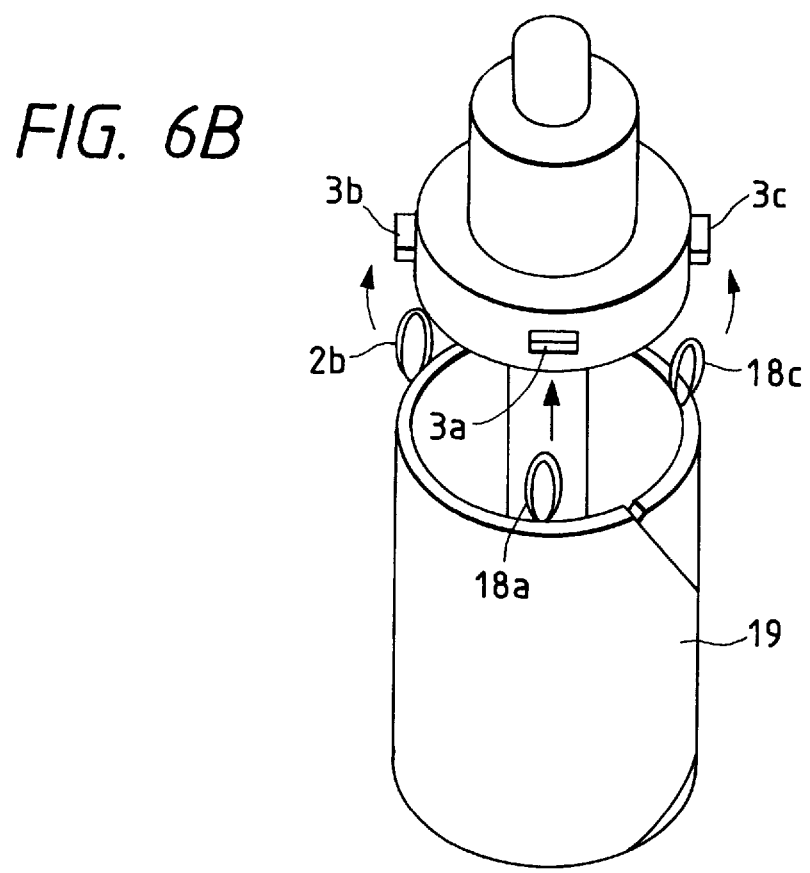
FIG. 6B is a partial perspective view of the sleeve type of coreless motor of the third embodiment.

FIG. 6A is a wiring diagram of a sleeve type of coreless motor of the third embodiment. FIG. 6B is a partial perspective view of the sleeve type of coreless motor of the third embodiment.

The sleeve type of coreless motor of the second embodiment has substantially the same structure as that of the first embodiment. The different is in the structure of the coils. More specifically, the wiring of coils 1a and 1b is similar to the first embodiment as shown in FIG. 1. In addition, open end coils 17a and 17c are provided. Therefore, a wire is wound to form the open end coil 17a, a tap 18a, the coil 1a, the tap 2b, the coil 1b, a tap 18c and the open end coil 17c. In other words, the open end coil 17a, the tap 18a, the coil 1a, the tap 2b, the coil 1b, the tap 18c and the open end coil 17c are made continuously. Therefore, the tap 18a, the tap 2b, and the tap 18c have the same form as shown in FIGS. 6A and 6B. Then, connecting the tap 18a, the tap 2b, and the tap 18c to the segments 3a to 3c, which have been manually provided, can be provided automatically by a mechanical processing. Moreover, an interlace portion 19 of the coils for forming the sleeve 33 is made large because of the presence of the open end coils 17a and 17c, so that the form of the sleeve 33 and a positional relation between the sleeve 33 and the other parts are provided stable. As the result, a quality of the sleeve type of the coreless motor of the third embodiment is stable. The operation of the third embodiment is similar to the first embodiment.

As mentioned, the open end coils may be provided both ends of the coils 1a and 1b to provide loop form taps 18a and 18c.

A fourth embodiment will be described.

Figure 7:
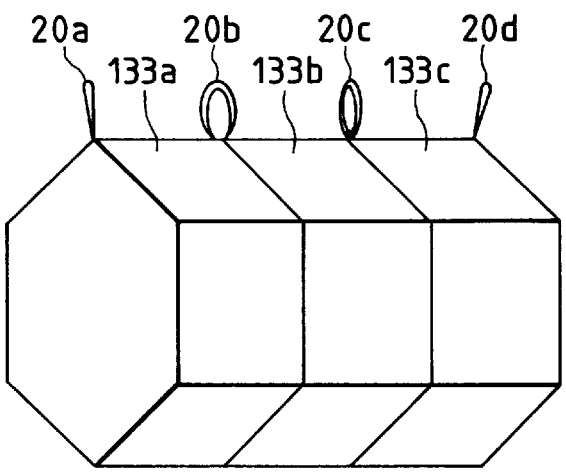
FIG. 7 is a wiring diagram of a sleeve type of coreless motor of a fourth embodiment.

FIG. 7 is a wiring diagram of a sleeve type of coreless motor of the fourth embodiment. Wiring of the coils of the fourth embodiment is similar to the coils the prior art shown in FIGS. 9 and 10. However, a wire forming the coils 133a to 133c and taps 20a to 20d is made of an alloy having a high tensile force strength. In this embodiment, the taps 20a and 20d should be connected to the same segment, so that a tensile force strength and a torsion strength are required. Moreover, a rigidity of the wire is necessary to maintain the form of the sleeve 33. Therefore, the annealed copper wire conventionally used cannot satisfy such requirements. Then, in the fourth embodiment, an alloy wire is used to form the coils 133a to 133c and the taps 20a to 20d.

Generally, a wire having a high tensile strength has a higher resistivity with the same diameter, so that the drive current is made small. The alloy wire having high tensile strength has been not used because a driving efficiency tends to be low. However, in the sleeve type of the coreless mother having a relative small diameter which may be used in a compact pager as an actuator of the vibrator for alerting the arrival of a call, using the alloy wire having a high tensile strength is efficient.

A fifth embodiment will be described.

Table 1 shows characters of materials for the conduction wire.

TABLE 1

| material | | tensile strength | resistivity | stretchability | |
|---|---|---|---|---|---|
| aluminum | | 68–107 | 2.82 | x | φ > 0.1 |
| copper nickel alloy | | 245–440 | 5.15 | Δ | φ > 0.1 |
| copper tin alloy | | 215–264 | 2.73 | Δ | φ > 0.05 |
| copper | A | 200–250 | 2.00 | ○ | φ > 0.02 |
| silver | B | 390–430 | 2.18 | ○ | φ > 0.03 |
| alloy | C | 450–500 | 3.50 | ○ | φ > 0.04 | tensile strength: $N/mm^2$, resistivity: $\mu\phi \cdot cm$, and φ: possible diameter of the wire The sleeve type of coreless motor of the fifth embodiment has the same structure and the same operation as the fourth embodiment. The difference in the material of the wire forming the coils and taps. In this embodiment, a copper silver alloy is used for the wire forming the coil and taps. As shown in Table 1, the copper silver alloy wire provides a high tensile strength with a stretchiablity and with respect to the resistivity, the drive current is made 50% to 90% of the drive current of the conventional sleeve type coreless motor having an annealed copper wire, so that a characteristic of the sleeve type of the coreless motor is improved. Moreover, the wire made of the copper silver alloy having a tensile strength 200–500 $N/mm^2$, and a resistivity of $2\mu\Omega \cdot cm$ to $3.5\mu\Omega \cdot cm$ is most favorable with respect to reducing the drive current and the resistivity to the defection due to the connection processing between the taps and the segments.

What is claimed is:

1. A coreless motor comprising;
   a stator having a circular slot therein, magnets on a wall of said slot, two brushes attached thereto, and metals, which are arranged concentrically; and
   a rotor having a shaft rotatably supported by said metals, a coil assembly, and a commutator arranged around said shaft, said coil assembly having successive first to Nth coils in said slot confronting said magnets and (N+1) taps and a commutator including segments respectively connected to said (N+1) taps, said first to Nth coils connected to said segments through said (N+1) taps, said two brushes selectively contacting with two of said segments successively, said N being a natural number more that one.

2. A coreless motor as claimed in claim 1, wherein said first to Nth coils have a sleeve form and each has a rectangular winding pattern, said first to Nth coils and said (N+1) taps form a continuous wire, and a coil opening angle of said coils is substantially 180° and a coil pitch of said coils ranges from 180°/(N+1) to 360°/(N+1).

3. A coreless motor as claimed in claim 1, wherein said coil assembly further has a first winding having a first end connected to said first coil through one of said (N+1) taps and a second end opened and a second winding having a third end connected to said Nth coil through another one of said (N+1) taps and a fourth end opened, and said first winding, said first to Nth coils, and said second winding form a sleeve and said (N+1) taps form a continuous wire.

4. A coreless motor as claimed in claim 1, wherein said coils are formed of a high tensile strength alloy wire.

5. A coreless motor as claimed in claim 1, wherein each of the coils comprises an alloy including at least copper and silver.

6. A coreless motor as claimed in claim 5, wherein said alloy has a resistivity of $2\mu\Omega \cdot cm$ to $3.5\mu\Omega \cdot cm$ and a tensile force strength from 200 $N/mm^2$ to 500 $N/mm^2$.

* * * * *